May 31, 1966 R. R. RICHOLT 3,253,613
FAIL SAFE SERVO VALVE
Filed July 1, 1963 4 Sheets-Sheet 1

INVENTOR.
ROBERT R. RICHOLT
BY
L. E. Carnahan
AGENT

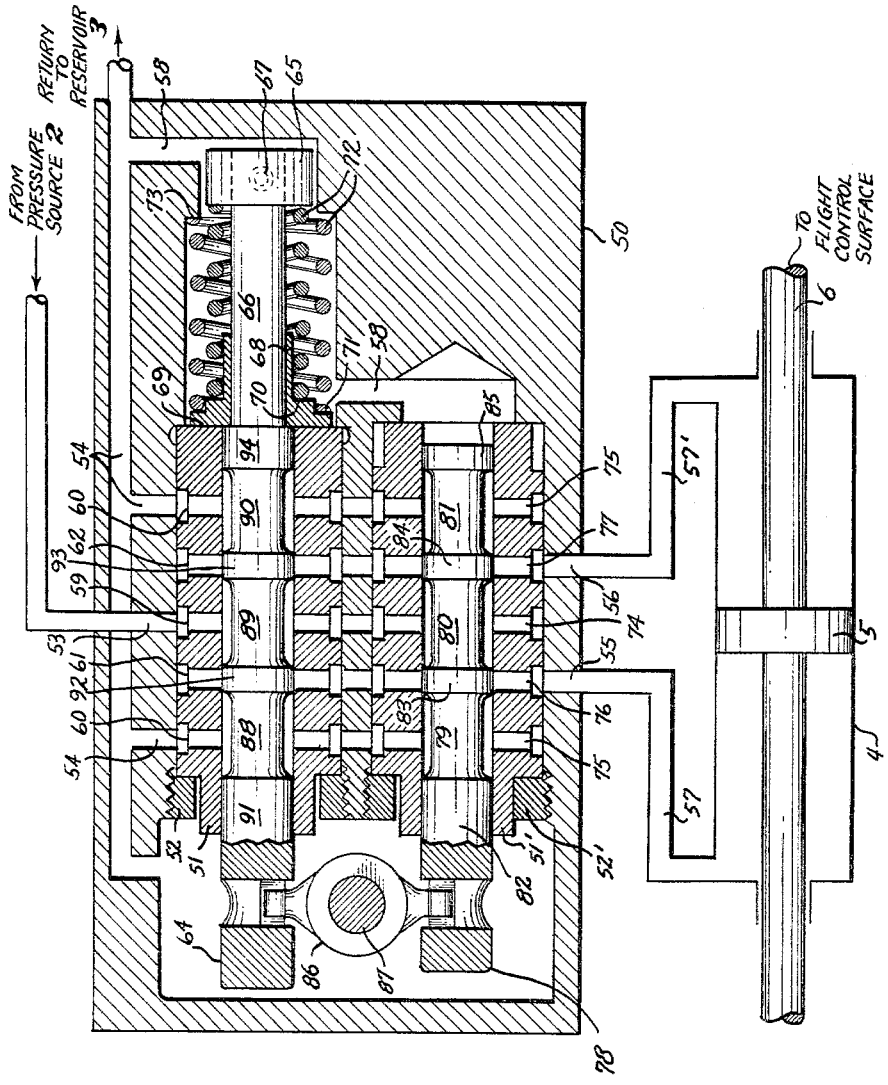
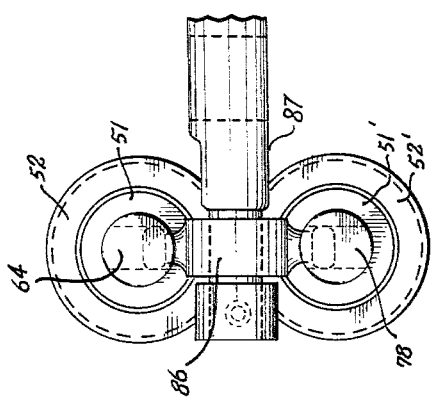

INVENTOR.
ROBERT R. RICHOLT
BY L E Carnahan
AGENT

INVENTOR.
ROBERT R. RICHOLT
BY L. E. Carnahan
AGENT

United States Patent Office 3,253,613
Patented May 31, 1966

3,253,613
FAIL SAFE SERVO VALVE
Robert R. Richolt, Bellevue, Wash., assignor to The Boeing Company, Seattle, Wash., a corporation of Delaware
Filed July 1, 1963, Ser. No. 291,682
16 Claims. (Cl. 137—596)

This invention relates to valves, and more particularly to fail safe servo control valves for hydraulic flight control mechanism.

Failure of the control valve on any hydraulic flight control servo becomes a catastrophic failure since the actuator will be powered to the extreme position when the control loop is opened. Therefore, it becomes imperative that the pilot be able to maintain control of the valve at all times.

Past history of accidents and incidents involving failure of the hydraulic flight controls on aircraft indicates that some were caused by sticking of the control valve, due to contamination, warpage, or physical damage. Loss of control of this valve causes the hydraulic actuating cylinder to drive the control surface toward a hard over position. The natural tendency of the pilot is to fight this, of course, and he will apply force in the opposite direction to the stick or pedal, as the case may be. However, if he cannot apply enough force to move the stuck valve spool in the direction to reverse the flow to the actuating cylinder his only recourse is to shut off the hydraulic power to the servo, if he reacts quick enough to prevent a crash.

This invention provides embodiments of control valves which utilize the natural reaction of the pilot to overcome the runaway control. By application of a force above the normal control force, the invention provides an override feature in case the main slide becomes seized which will cancel and override the stuck slide or spool. This eliminates the quick reaction time required of the pilot to prevent a crash. The invention also provides embodiments of a control valve which has alternate means of control in case the mechanical load control path is interrupted.

Therefore, it is an object of this invention to provide a control valve having fail safe features.

A further object of the invention is to provide a servo control valve to circumvent actuator control problems arising from jamming of the control valve spool element with respect to its sleeve.

A still further object of the invention is to provide a control valve for hydraulic flight control which utilizes the natural reaction of the pilot to overcome a runaway control condition.

Another object of the invention is to provide a control valve having an override feature in case the main slide becomes seized.

Another object of the invention is to provide a control valve having alternate means of control in case the mechanical load control path is interrupted.

Another object of the invention is to provide a control valve having an alternate mechanical load control path to maintain constant control of the valve.

Another object of the invention is to provide a control valve for hydraulic flight control having an override feature in case of spool seizure and alternate means of control in case the mechanical load control path is interrupted.

Other objectives of the invention not specifically set forth above will become readily apparent from the following description and drawings in which:

FIG. 2 is another embodiment of the invention partially in cross-section;

FIG. 3 is an end view of the actuating mechanism of the FIG. 2 embodiment;

Figure 1:
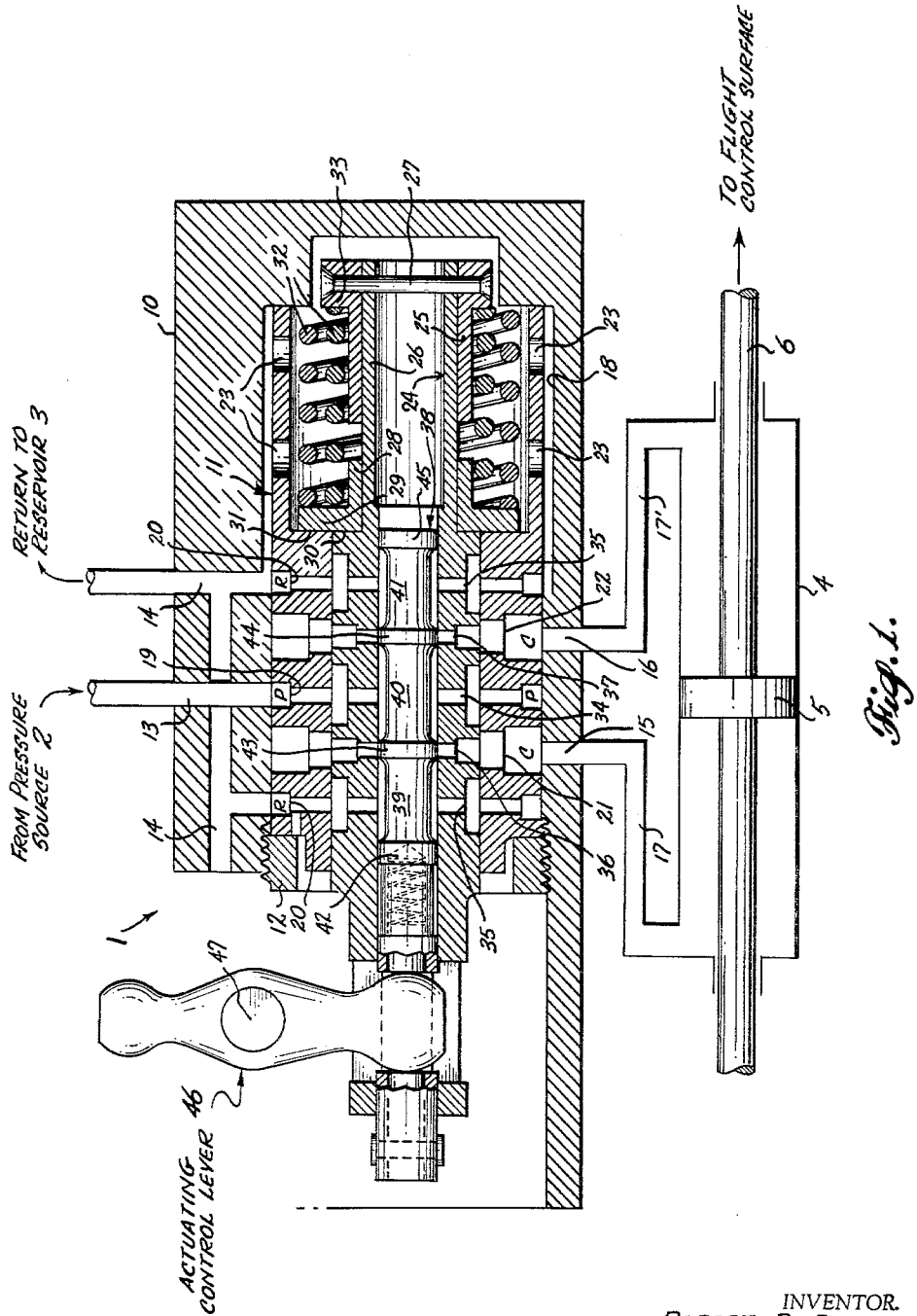
FIG. 1 is a view partially in cross-section showing an embodiment of the invention connected with an actuating cylinder for a flight control surface.

FIG. 1 illustrates a control valve generally indicated at 1 operatively connecting a fluid pressure source 2 and low pressure reservoir 3 with an actuating cylinder 4 having a power piston 5 which is connected to flight control surfaces of an aircraft, as indicated by legend, by rod 6 which is shown integral with piston 5.

Control valve 1 comprises a housing 10, an outer sleeve 11 fixedly held in housing 10 by a hollow collar 12 externally threaded to engage internal threads in housing 10. Housing 10 has provided therein a pressure passageway 13 connected with fluid pressure source 2, low pressure return passageways 14 connected with fluid reservoir 3, and passageways 15 and 16 which are connected through conduits 17 and 17' to opposite ends of actuating cylinder 4. The chamber in the right hand side of housing 10 is larger in diameter than sleeve 11 to define an annular passageway 18 around that portion of the sleeve which is connected with return passageways 14.

Outer sleeve 11 is provided with an annular groove and a plurality of radial passages indicated at 19 which align with pressure passageway 13; a pair of annular grooves and radial passages indicated at 20 which align with return passageways 14; annular grooves and radial passages indicated at 21 and 22 which align with passageways 15 and 16, respectively; and apertures 23 interconnecting the interior of the right hand portion of sleeve 11 with annular passageway 18.

An inner sleeve or slide 24 is slidably positioned within outer sleeve 11 and held in alignment with respect to sleeve 11 by retainer means comprising a first collar 25 attached to a reduced diameter portion 26 of sleeve 24 by pin 27, a second collar 28 moveably positioned around reduced portion 26 of sleeve 24 and having a flange portion 29 which abuts with a shoulder 30 of sleeve 24 and a shoulder 31 of sleeve 11. A pair of coaxial centering coil springs 32 are positioned between collars 25 and 28 and abut against flange 29 of collar 28 and a flange portion 33 of collar 25 and a shoulder on housing 10. The tension of springs 32 is designed to normally position grooves and passages of sleeve 24, described hereinafter, with the radial passages and annular grooves 19, 20, 21 and 22 of sleeve 11, thus having, in this embodiment, a 50 to 100 lbs. preload to prevent normal operation of the valve from moving sleeve 24 with respect to sleeve 11.

Inner sleeve 24 is provided with an annular groove and radial passages indicated at 34 which normally align with groove and passages 19 of sleeve 11; an annular groove and radial passages indicated at 35 which normally align with grooves and passages 20 of sleeve 11; and annular grooves and radial passages indicated at 36 and 37 which normally align with grooves and passages 21 and 22, respectively, of sleeve 11, Whereby in normal operation of valve 1, grooves and passages 34, 35, 36 and 37 of inner sleeve 24 substantially define continuations of grooves and passages 19, 20, 21 and 22, respectively, of outer sleeve 11.

Slidably positioned in inner sleeve 24 is a valve spool or slide 38 having reduced diameter portions 39, 40 and 41 and lands 42, 43, 44 and 45. As shown in FIG. 1, lands 43 and 44 of valve spool 38 are so positioned in sleeve 24 as to cut-off fluid transfer between grooves and passages 34 and 37 and between grooves and passages 36 and 35 of sleeve 11, thus holding piston 5 of actuating cylinder 4, rod 6, and the attached mechanism in a certain desired position.

Inner sleeve 24 and valve spool 38 have apertures therethrough within which an actuating control lever 46 is positioned, said lever 46 being pivoted about point 47 by desired control mechanism, not shown, whereby movement of lever 46 about pivot point 47 moves valve spool 38 with respect to inner sleeve 24.

In normal operation of valve 1, centering springs 32 hold inner sleeve 24 against fixed outer sleeve 11 and valve spool 38 when actuated by lever 46 moves with respect to inner sleeve 11 thus allowing pressure fluid from source 2 to pass from grooves and passages 19 and 34 to either of grooves and passages 36 and 21 or 37 and 22, depending on the direction of movement of spool 38, to cylinder 4 through conduits 17 or 17' thereby moving piston 5 to the right or to the left as viewed in FIG. 1.

In case of seizure of valve spool 38 to inner sleeve 24, sleeve 24 acts as an override of spool 38 by overcoming the tension of centering springs 32 due to the force applied to lever 46 whereby pressure fluid from source 2 passes from groove and passages 19 through groove and passages 36 to either of grooves and passages 21 or 22 depending on the direction of movement of lever 46 and inner sleeve 11. With this arrangement, the pilot can position the flight control surface as desired by application of additional force to deflect centering springs 32. Thus, the pilot can continue to control the aircraft by power control with only the handicap of a higher breakout or threshold force, the amount of higher threshold being dependent upon the spring preload setting.

In a particular installation of the FIG. 1 embodiment a 100 lb. preload setting on springs 32 would require 18½ lbs. control stick force to override valve spool 38 when seized. This is well below the autopilot force authority for the system so that the protection applies for both manual control and autopilot control modes of flight.

FIGS. 2 and 3 illustrate a control valve wherein the override elements are substantially parallel to the normal control elements but not coaxial therewith as in the FIG. 1 embodiment. As in the FIG. 1 embodiment, the FIG. 2 control valve operatively interconnects actuating cylinder 4 with fluid pressure source 2 and low pressure reservoir 3 for actuating mechanism such as flight control surfaces of an aircraft via movement of piston 5 and integral rod 6 of cylinder 4. The valve comprises a housing 50 having chambers therein within which sleeves 51 and 51' are positioned and fixedly held in the housing by externally threaded hollow collars 52 and 52', respectively, which engage internal threads in housing 50. Housing 50 is also provided with a pressure passageway 53 which is connected with source 2, low pressure return passageways 54 which is connected with fluid reservoir 3, and passageways 55 and 56 which are connected through conduits 57 and 57' to opposite ends of cylinder 4. The right hand side of the chambers in housing 50 are connected wth return passageways 54 through passageways 58 and 58'.

Sleeve 51 is provided with an annular groove and a plurality of radial passages indicated at 59 which align with pressure passageway 53; a pair of annular grooves and radial passages indicated at 60 which align with return passageways 54; and annular grooves and radial passages indicated at 61 and 62 which align through sleeve 51' and passageways 55 and 56, respectively.

A valve spool or slide 64, described in detail hereinafter, is slidably positioned within sleeve 51 and held in a predetermined position with respect to sleeve 51 by retainer means comprising a first collar 65 attached to a reduced diameter portion 66 of spool 64 by pin 67, a second collar 68 moveably mounted around reduced portion 66 of spool 64 and having a flange portion 69 which abuts with fixed sleeve 51. Collar 68 is provided with shoulders 70 and 71. A pair of coaxial centering coil springs 72 are positioned between collars 65 and 68 and abut against shoulders 70 and 71 of collar 68 at one end and against collar 65 and a shoulder 73 of housing 50 at their other end. The tension of springs 72 is designed to normally position reduced diameter areas and lands of valve spool 64, described hereinafter, with the radial passages and annular grooves 59, 60, 61 and 62 of sleeve 51, thus preventing normal operation of the valve from moving spool 64 with respect to sleeve 51, the spring preload again being from 50 to 100 lbs.

Sleeve 51' is provided with an annular groove and a plurality of radial passages indicated at 74 which align with passageway 53 of housing 50 and with groove and passages 59 of sleeve 51; and annular groove and radial passages indicated at 75 which align with passageways 54 of housing 50 and with grooves and passages 60 of sleeve 51' and annular grooves and radial passages indicated at 76 and 77 which align with passageways 55 and 56, respectively, of housing 50 and with grooves and passages 61 and 62, respectively, of sleeve 51, whereby grooves and passages 74, 75, 76 and 77 of sleeve 51' substantially define continuations of grooves and passages 59, 60, 61 and 62, respectively, of sleeve 51.

Slidably positioned in sleeve 51' is a valve spool or slide 78 having reduced diameter portions 79, 80 and 81 and lands 82, 83, 84 and 85. Lands 83 and 84 are shown in FIG. 2 positioned in sleeve 51' so as to cut-off fluid transfer to and from actuating cylinder 4, thus holding the mechanism attached to rod 6 in a desired position.

Spool valves 64 and 78 each have apertures therethrough within which ends of a link 86 are positioned, said link 86 being controlled by valve operating lever 87 by desired control mechanism, not shown. Each end of link 86 is contoured so as to allow either end of the link to function as a pivot point for the other end of the link, whereby movement of lever 87 normally functions to move spool 78 due to link 86 pivoting within the aperture in spool 64, spool 64 being held against movement by centering springs 72 under normal operation of the valve.

Valve spool 64 is provided with reduced diameter portions 88, 89, and 90 and lands 91, 92, 93 and 94. Due to the preload of centering springs 72, lands 91, 92, 93 and 94 of spool 64 are positioned during normal valve operation to provide continuous fluid passageways, through reduced diameter portions 88, 89 and 90, between sleeve 51' and passageways 53 and 54.

In normal operation of the FIG. 2 valve pressure fluid from source 2 passes through passageway 53, groove and passages 59 of sleeve 5, around reduced portion 89 of spool 64, through the portion of passageway interconnecting sleeve 51 and sleeve 51', groove and passages 74 of sleeve 51' to the area around reduced portion 80 of spool 78, further passage of fluid being prevented by lands 83 and 84 of spool 78. Movement of spool 78 to the right by lever 87 and link 86, for example, moves land 84 to the right which allows the pressure fluid to then pass through passages and groove 77, passageway 56, conduit 57' to the right hand side of cylinder 4 thereby moving piston 5 to the left which force the fluid within the left hand chamber of cylinder 4 through conduit 57, passageway 55, groove and passages 76, around reduced portion 79 of spool 78, passages and groove 75 of sleeve 51', interconnecting portion of passageway 54, groove and passages 60, passageway 54 to low pressure reservoir 3. Movement of valve spool 78 to the left will direct pressure fluid through passageway 55 to the left hand side of cylinder 4 and allow fluid from the right hand chamber of the cylinder to discharge through passageway 56 to reservoir 3.

In case of seizure of valve spool 78, pressure on lever 87 will cause link 86 to pivot about the end positioned in spool 78 and move spool 64 to the right, for example, by overcoming the tension of centering springs 72. Movement of lands 92 and 93 to the right allows pressure fluid to pass from groove and passages 59 through passages and groove 62, interconnecting portion of passageway 56, groove 77, passageway 56, and conduit 57' to the right hand side of cylinder 4, the fluid from the left hand chamber of cylinder 4 discharging through conduit 57, passageway 55, groove 76, interconnecting portion of passageway 55, groove and passages 61, passages and groove 60, passageways 54 to reservoir 3. Movement of valve spool 64 to the left will direct pressure fluid to the left hand side of cylinder 4 and discharge the fluid in the right hand chamber of the cylinder to reservoir 3.

As in the FIG. 1 embodiment, the FIG. 2 control valve operates upon normal reaction of the pilot to override the normal valve operation to provide continuous power control for the flight control surfaces.

While the control valve embodiments shown in FIGS. 1–3 illustrate the override feature in case of seizure or partial seizure of the valve spool or slide due to contamination or thermal expansion or contraction of the parts, the control valve embodiment shown in FIGS. 4–7 illustrate the override feature in case of seizure and additionally illustrates the alternate means of control in case the mechanical control path was interrupted.

The possibility of an interruption of the mechanical load control path is probably the most dangerous since it is subject to human error. A lost bolt or pin joint in the control linkage means a run-away action of the hydraulic actuator and the pilot does not have a chance to override, which has been the cause of several aircraft crashes.

The embodiment of the invention illustrated in FIGS. 4–7 provides a solution to the above stated problem by providing two control valves, each with its own positioning linkage, all in one unit. Since the two valves are not operated simultaneously there is no matching or phasing problem such as there would be if the two valves were separated or operated in parallel. Each of the two valves is a dual tandem valve since it must simultaneously control flow to the two sections of an associated dual tandem actuator and the flow to the two sections must be in phase to provide smooth operation. Thus two separate hydraulic flight control power systems are provided because of the vulnerability of the power supply system.

Broadly, the invention as shown in FIGS. 4–7 is a safety linkage mechanism for a dual spool valve having application in a control system for aircraft flight control surfaces. More particularly, each valve spool is provided with a separate mechanical control path so that seizure or breakage of either spool or its controlling linkage can be readily overridden. The mechanism essentially comprises a first pair of generally coextensive levers operable by a single control rod and suitably connected to a pair of coaxial shafts one of which is fitted within the other, and a second pair of generally coextensive levers integral with respective shafts at one end and suitably connected with respective valve spools at the other end. Lost motion provisions are included in one of the mechanical control paths so that when the control rod is actuated both linkage systems are moved, but one through a greater path than the other, and thus one spool is stroked a longer distance than the other. The flow slots in the spools are formed substantially identical so that each spool passes one half of the control authority in flow so that failure of one spool or its associated control linkage may be readily overcome by the other subsystem.

Figure 4:
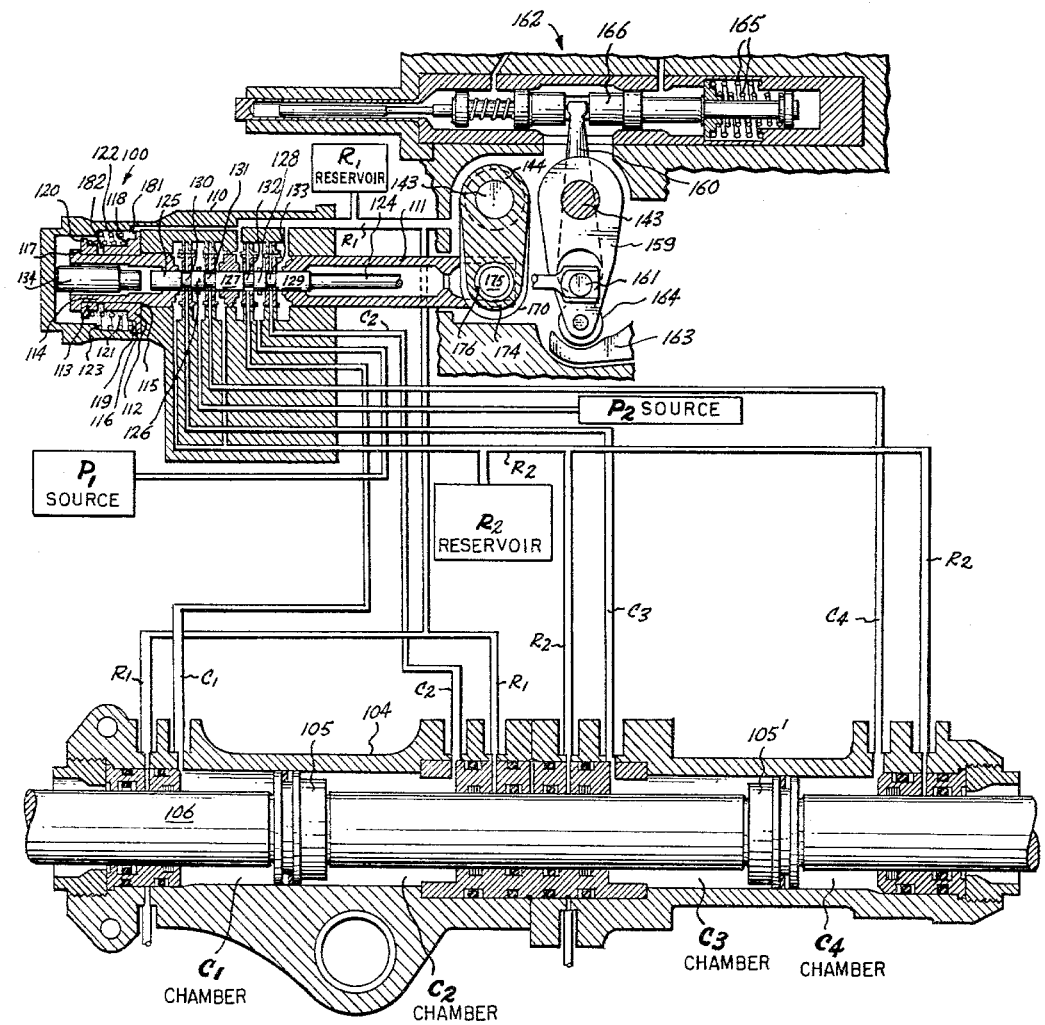
FIG. 4 is a schematic view of another embodiment of the invention operatively connected with fluid pressure sources and an actuating cylinder.

Referring now to FIG. 4 which comprises a control valve 100 operatively connecting a pair of fluid pressure sources $P_1$ and $P_2$ and reservoirs $R_1$ and $R_2$ with an actuating cylinder generally indicated at 104 having a pair of axially aligned power pistons 105 and 105' which are connected to flight control surfaces of an aircraft by rod means 106.

Control valve 100 comprises a housing 110, a sleeve or slide 111 normally held with respect to housing 110 by center means comprising a pair of collars 112 and 113 movably mounted on a reduced portion 114 of sleeve 111, collar 112 abutting against a shoulder 115 of sleeve 111 and having a flange portion 116 which abuts against housing 110, while collar 113 abuts against a shoulder 117 of sleeve 111. Collar 112 is provided with steps or shoulders 118 and 119 and collar 113 includes a flange portion 120. Sleeve 111 is held in desired alignment with housing 110 by a pair of coaxial centering coil springs 121 and 122, spring 121 being positioned between shoulder 118 of collar 112 and flange 120 of collar 113, with spring 122 being positioned between shoulder 119 and a shoulder 123 of housing 110.

Sleeve 111 is provided with two sets of annular grooves and radial passages which align with corresponding sets of grooves and passages in housing 110 which as viewed in FIG. 4 from right to left are connected with passageways generally indicated at $R_1$, $C_2$, $P_1$, $C_1$ and $R_1$; and $R_2$, $C_4$, $P_2$, $C_3$ and $R_2$. Passageway $P_1$ of the first set and $P_2$ of the second set interconnect the control valve with fluid pressure sources $P_1$ and $P_2$, respectively. Passageways $R_1$ of the first set and $R_2$ of the second set interconnect the valve with reservoirs $R_1$ and $R_2$, respectively. In addition, reservoirs $R_1$ and $R_2$ are interconnected with drain passages of cylinder 104 by conduits indicated by corresponding reference numerals $R_1$ and $R_2$. Passages $C_1$ and $C_2$ of the valve are connected with chambers $C_1$ an $C_2$, respectively, of cylinder 104 which are located on opposite sides of piston 105, while passages $C_3$ and $C_4$ of the valve are connected with chambers $C_3$ and $C_4$, respectively, located on opposite sides of piston 105' in cylinder 104.

Slidably positioned in sleeve 111 is a valve spool or slide 124 having a plurality of lands 125, 126, 127, 128 and 129 and a plurality of reduced diameter portions 130, 131, 132 and 133.

A stop 134 is positioned within an enlarged diameter cavity within sleeve 111 and in axial alignment with valve spool 124 which function is described hereinafter.

It is thus seen that movement of spool 124 to the left, for example, interconnects passageways $P_1$ with $C_2$, $P_2$ and $C_4$, $C_1$ with $R_1$, and $C_3$ with $R_2$ whereby fluid pressure from sources $P_1$ and $P_2$ is directed to chambers $C_2$ and $C_4$, respectively, of cylinder 104 while chambers $C_1$ and $C_3$ of cylinder 104 are connected, respectively, with reservoirs $R_1$ and $R_2$ which moves pistons 105 and 105' and rod 106 to the left thereby moving the associated flight control surface to a desired position. Movement of spool 124 to the right of the neutral position shown in FIG. 4 interconnects pressure sources $P_1$ and $P_2$ with chambers $C_1$ and $C_3$, respectively, of cylinder 104 while allowing fluid from chambers $C_2$ and $C_4$ to discharge to reservoirs $R_1$ and $R_2$, respectively, thereby moving pistons 105 and 105' to the right.

The override feature in case of seizure of spool 124 of the FIG. 4 embodiment operates similar to the FIG. 1 embodiment in that additional force of the lever mechanism of the valve, due to the pilot's reaction, moves sleeve 111 by overcoming the tension of centering springs 121 and 122 whereby the annular grooves and radial passages of the sleeve direct pressure fluid from the sources $P_1$ and $P_2$ to chambers $C_1$ and $C_3$, respectively, or to chambers $C_2$ and $C_4$, respectively, while allowing fluid within chambers $C_2$ and $C_4$ or within chambers $C_1$ and $C_3$ to discharge to their respective reservoirs $R_1$ and $R_2$ thus providing the pilot with continuous power control of the flight control surfaces.

In addition to the override feature, the FIG. 4 embodiment provides a system wherein failure of a pressure source, rupture of fluid lines, etc., is overcome by providing a dual system thus increasing the safety capability of the overall flight control system.

Figure 5:
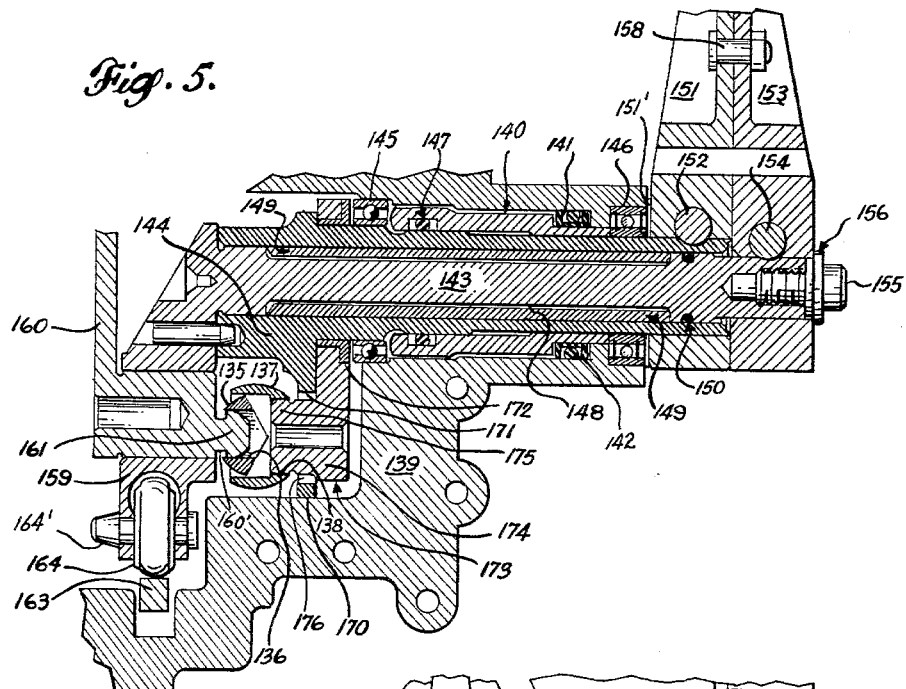
FIGS. 5 and 6 show portions of the alternate mechanical load paths for the FIG. 4 control valve.
Figure 6:
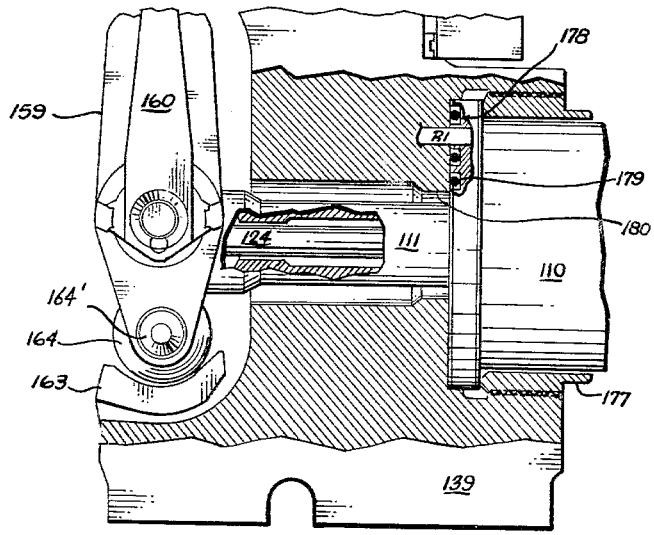
Figure 7:
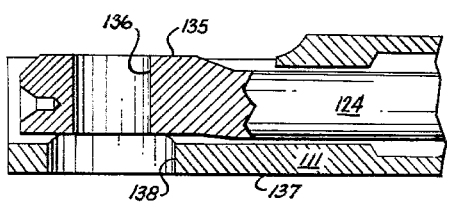
FIG. 7 is an enlarged view, shown partially in cross-section, of the outer ends of the slide elements of the FIG. 4 valve.

In addition to providing dual pressure source, dual valving and dual cylinder actuation, the embodiment of the invention illustrated in FIGS. 4–7 provides an alternate mechanical load control path for the valve to negate the possibility of system failure due to a broken or lost element which includes slide or valve spool 124 and slide or sleeve 111. This dual mechanical control path comprises separate, though interrelated, actuating members for the spool 124 and sleeve 111. FIG. 5 shows the mechanism for separately controlling the two actuating members, emphasizing the pilot operated portion of the mechanism and the two levers thereof connected to the two actuating members. In FIG. 6, a side elevation of the FIG. 5 control mechanism clearly shows the autopilot operated portion of the control mechanism. The two pilot operated levers and the autopilot operated lever for controlling the two actuating members for spool 124 and sleeve 111 are shown schematically in FIG. 4 as juxtaposed, although it may be seen from FIG. 5 that the levers should appear superimposed on one another. Each of the pilot operated levers are mounted on shaft 143, the end of one connected to the actuating member end of spool 124 and the other connected to the actuating member end of sleeve 111. Spool 124 actuating member terminates an enlarged outer end portion 135 having an aperture 136 therethrough (see FIG. 7), end portion 135 being shown in sectional end view in FIG. 5. Sleeve 111 actuating member terminates in a reduced diameter end portion 137 having a portion cut away to provide operating space for end portion 135 of spool 124 (see FIG. 7), end portion 137 having an aperture 138 therethrough and being shown in FIG. 5 in sectional end view.

The mechanical load path to sleeve 111 and spool 124 as shown schematically in FIG. 4 and in detail in FIGS. 5 and 6 comprises a housing 139, only a portion of which is shown, a spacer bearing 140 mounted in housing 139 and having a reduced portion within which a channel seal 141 is located, seal 141 including an O-ring 142. A pair of control shafts 143 and 144, arranged one within the other, are rotatably mounted within spacer bearing 140 and a pair of anti-friction bearings 145 and 146 positioned at opposite ends of spacer 140 and supported in housing 139. Shaft 143 extends beyond shaft 144 at each end. An O-ring 147 is provieded between outer control shaft 144 and an annular groove in spacer 140. Inner control shaft 143 has a reduced portion 148, a split bushing 149 being positioned within reduced portion 148 between shafts 143 and 144. Inner control shaft 143 is also provided with an annular groove having an O-ring 150 therein.

A control lever 151 is fixedly attached to one end of outer control shaft 144 by splines and secured thereto by a clamp bolt 152. A Teflon washer 151' is positioned between lever 151 and housing 139 to prevent icing or freezing of the lever to the housing. A control lever 153 is fixedly attached to one end of inner control shaft 143, adjacent to lever 151, by splines and secured thereto by a clamp bolt 154 and by a cap screw 155, washer 156 and a lock wire (not shown). Control levers 151 and 153 are fastened together by means such as bolt 158.

Inner control shaft 143 is provided with an integral portion defining a lever 159 which controls the position of valve spool 124 through an integral lever 160 and stub-shaft 160' having a ball-like portion 161 which is operatively positioned in aperture 136 of spool 124; lever 160 is operatively connected with an auto-pilot actuator mechanism shown schematically in FIG. 4 and generally indicated at 162. The mechanism for introducing auto-pilot signals to the control valve does not relate to the instant invention and thus will not be described. Suffice to say that the valve spool 124 is positioned by the autopliot through lever 160 during the automatic mode of operation when lever 159 is held fixed by cam 163 and roller 164 by mechanism not shown, roller 164 being supported in lever 159 by bolt 164'. When the pilot is controlling valve position cam 163 and roller 164 are released as shown in FIG. 4 and centering springs 165 on the autopilot actuator hold piston 166 which in turn holds one end of lever 160 fixed so that valve spool 124 is controlled directly through lever 159, the free end of lever 160, stub-shaft 160' and ball-like portion 161.

A lost motion, equivalent to the effective stroke of the primary slide or valve spool 124, is provided in the control linkage to the secondary slide or sleeve. Outer control shaft 144 is provided with an integral portion defining a lever 170, lever 170 being provided with an aperture 171 which is larger in diameter than and substantially aligns with aperture 138 in sleeve 111. A guide 172 is mounted on shaft 144 to provide free rotatable support for a lever or crank 173 having a cylindrical stud portion 174 which extends through aperture 171 of lever 170, said stud portion 174 terminating in a ball-like configuration 175 which is operatively positioned in aperture 138 of sleeve 111. Stud portion 174 of crank 173 is centered in aperture 171 of lever 170 at the neutral position of the valve to provide a lost motion clearance 176 between the movement of spool 124 and sleeve 111.

As shown in FIG. 6, valve housing 110 is held in housing 139 by a locking nut 177. Multiple O-rings (8 in this embodiment) are positioned between housing 139 and valve housing 110 to seal passages between valve housing 110 and housing 139, one such O-ring being shown in FIG. 6 at 178 and disposed around low pressure passageway $R_1$; and an O-ring 179 is positioned between said housing and around an opening in 180 in housing 139 through which sleeve 111 and spool 124 extend.

With control levers 151 and 153 held together by bolt 158 initial movement thereof moves levers 159 and 170 together. This action strokes the primary slide or spool 124 relative to the secondary slide or sleeve 111, until the lost motion clearance 176 is closed whereupon further movement of the levers overcomes the tension of centering springs 121 and 122 and strokes the sleeve relative to housing 110. The flow slots (grooves and radial passages) for spool 124 and sleeve 111 are equivalent so that each of these slides has a nominal 50 percent of the valve flow capacity. Herein lies the fail safe feature of the FIG. 4–7 embodiment, each slide having ½ the total authority in flow, so that should one slide or its control linkage become seized or the load path interrupted in any manner, its authority can be cancelled by the other, thus giving the pilot an opportunity to override the failure. The valve also includes provisions to control a run-a-way caused by a direct breakage of spool 124 by limiting stroke of the broken parts. This is provided by the auxiliary stop 134 in one direction and by the clearance of the end of the spool with the housing 110 in the other direction. Movement of sleeve 111 to the left is limited by the clearance between collar 112 and housing 110 indicated at 181 and movement to the right by clearance between collars 112 and 113 indicated at 182 (see FIG. 4).

It will be noted that most flight maneuvers will be performed using the valve spool 124, and the sleeve 111 will be operated only when fast action is required such as at take-off or landing when greater velocity is required of the aircraft's elevator (for example). Autopilot control will operate only the primary slide (valve spool 124) since the autopilot rate authority is limited to about 25 percent of the total. When the control valve 100 is stroked far enough to operate the secondary slide (sleeve 111) the 20 pound preload force of centering springs 121 and 122 must be overcome by additional force input by the pilot but this 20 pound force at the valve represents 4.7 pounds at the control column. This means an additional hysteresis loop in the force versus deflection characteristics at the control column if more than 50 percent velocity is demanded. Below 50 percent velocity of operation (where most of the flying is done) there is no change in stick force characteristics.

It has thus been shown that the instant invention provides a fail safe control valve which greatly reduces the possibility of failure of the overall system due to seizure of elements of the valve, broken or lost mechanical load path elements, failure of a fluid pressure source, or fluid passageway rupture, while providing a control system which compatibly operates with the natural reaction of the operator of the overall system such as the pilot of an aircraft.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim is:

1. A fail-safe fluid control valve comprising
a housing,
first and second fluid passageways connected to said housing for inlet and return of fluid, respectively,
third and fourth fluid passageways for connecting said housing to hydraulic actuator means,
first and second valve means movable within said housing and normally movable relative to each other for selectively controlling fluid flow from said first and second passageways to said third and fourth passageways,
means for positioning said first and second valve means within said housing, and
means resiliently biasing said second valve means against movement within said housing, whereby the flow of fluid through said housing is controlled normally by the movement of said first valve means only, and may be further controlled by applying to said means for positioning a force sufficient to overcome the means resiliently biasing said second valve means.

2. The combination according to claim 1 wherein
said first and second valve means define a plurality of passageways interconnecting said first, second, third and fourth passageways,
said plurality of passageways being so positioned and dimensioned that suitable movement of said first valve means when seizure occurs in said second valve means will cause said first valve means to produce an equalization of pressures in said third and fourth passageways to override the action produced by said second valve means alone.

3. The combination according to claim 1 wherein
said first and second valve means define a plurality of passageways interconnecting said first, second, third and fourth fluid passageways,
said plurality of passageways being so positioned and dimensioned that suitable movement of said second valve means when seizure occurs in said first valve means will cause said second valve means to produce an equalization of pressures in said third and fourth passageways to override the action produced by said first valve means alone.

4. The combination according to claim 3 wherein
said first and second valve means comprise concentrically mounted spool and sleeve valve members.

5. The combination according to claim 4 wherein
said means for positioning includes a lost-motion linkage operable normally to act first upon said first valve means alone and then upon said first and second valve means simultaneously.

6. The combination according to claim 4 wherein
said means for positioning includes first and second means for actuating said spool and sleeve valve members,
whereby the failure of either of said first and second means for actuating will result in operation by the other of said means for actuating.

7. The combination according to claim 3 wherein
said first and second valve means comprise separate spool valve members.

8. The combination according to claim 7 wherein
said means for positioning includes a differential lever arrangement operable normally to act first upon said first valve means alone and then upon said second valve means alone.

9. A fail-safe fluid control valve comprising
a housing,
first and second fluid passageways connected to said housing for inlet and return of fluid, respectively,
hydraulic actuators means,
third and fourth fluid passageways connecting said housing to hydraulic actuator means,
first and second valve means movable within said housing and normally movable relative to each other for selectively controlling fluid flow from said first and second passageways to said third and fourth passageways,
said first and second valve means defining a plurality of passageways interconnecting said first, second, third and fourth fluid passageways,
means for positioning said first and second valve means within said housing, and
means resiliently biasing said second valve means against movement within said housing,
whereby the flow of fluid through said housing is controlled normally by the movement of said first valve means only, and may be further controlled by applying to said means for positioning a force sufficient to overcome the means resiliently biasing said second valve means.

10. The combination according to claim 9 wherein
said plurality of passageways are so positioned and dimensioned that suitable movement of said second valve means when seizure occurs in said first valve means will cause said second valve means to produce an equalization of pressures in said third and fourth passageways to override the action produced by said first valve means alone.

11. The combination according to claim 9 wherein
said plurality of passageways are so positioned and dimensioned that suitable movement of said first valve means when seizure occurs in said second valve means will cause said first valve means to produce an equalization of pressures in said third and fourth passageways to override the action produced by said second valve means alone.

12. The combination according to claim 9 wherein
said first and second valve means comprise concentrically mounted spool and sleeve valve members.

13. The combination according to claim 9 wherein
said first and second valve means comprise separate spool valve members.

14. The combination according to claim 9 wherein
said means for positioning includes a lost-motion linkage operable normally to act first upon said first valve means alone and then upon said first and second valve means simultaneously.

15. The combination according to claim 9 wherein said means for positioning includes a differential lever arrangement operable normally to act first upon said first valve means alone and then upon said second valve means alone.

16. The combination according to claim 9 wherein said means for positioning includes first and second means for actuating said first and second valve members, whereby the failure of either of said first and second means for actuating will result in operation by the other of said means for actuating.

References Cited by the Examiner

UNITED STATES PATENTS

| | | | |
|---|---|---|---|
| 2,631,571 | 3/1953 | Parker | 137—625.68 |
| 2,771,907 | 11/1956 | Joy | 137—625.48 X |
| 2,781,782 | 2/1957 | Gerwig | 137—625.48 X |
| 3,099,289 | 7/1963 | Neilson et al. | 137—596 |
| 3,152,610 | 10/1964 | McAfee | 137—625.69 X |

MARTIN P. SCHWADRON, *Primary Examiner.*

HENRY T. KLINKSIEK, *Examiner.*

M. CARY NELSON, *Assistant Examiner.*

Disclaimer 3,253,613.—*Robert R. Richolt*, Bellevue, Wash. FAIL SAFE SERVO VALVE. Patent dated May 31, 1966. Disclaimer filed Jan. 20, 1978, by the assignee, *The Boeing Company*.

Hereby enters this disclaimer to claims 1, 2, 3, 4, 9, 10, 11, 12 and 13 of said patent.

[*Official Gazette April 18, 1978.*]